(12) United States Patent (10) Patent No.: US 10,657,274 B2
Cho et al. (45) Date of Patent: May 19, 2020

(54) SEMICONDUCTOR DEVICE INCLUDING MEMORY PROTECTOR

(71) Applicant: Samsung Electronics Co., Ltd., Suwon-si, Gyeonggi-do (KR)

(72) Inventors: Kyong-Ho Cho, Seoul (KR); Woo-Hyung Chun, Yongin-si (KR); Dong-Jin Park, Seoul (KR); Seong-Min Jo, Seoul (KR); Jin-Sung Yang, Suwon-si (KR)

(73) Assignee: Samsng Electronics Co., Ltd., Gyeonggi-do (KR)

( * ) Notice: Subject to any disclaimer, the term of this patent is extended or adjusted under 35 U.S.C. 154(b) by 65 days.

(21) Appl. No.: 15/170,132

(22) Filed: Jun. 1, 2016

(65) Prior Publication Data

US 2016/0379004 A1 Dec. 29, 2016

(30) Foreign Application Priority Data

Jun. 29, 2015 (KR) .................. 10-2015-0092246
Aug. 24, 2015 (KR) .................. 10-2015-0118708

(51) Int. Cl.
*G06F 21/00* (2013.01)
*G06F 21/62* (2013.01)
*G06F 3/06* (2006.01)
*G06F 12/14* (2006.01)

(52) U.S. Cl.
CPC ........ *G06F 21/6218* (2013.01); *G06F 3/0622* (2013.01); *G06F 3/0655* (2013.01); *G06F 3/0679* (2013.01); *G06F 12/1441* (2013.01)

(58) Field of Classification Search
CPC ........ G06F 3/0622; G06F 21/79; G06F 12/14; G06F 3/0644; G06F 3/0659; G06F 3/0679; G06F 12/145; G06F 21/74; G06F 21/6218; G06F 3/0655; G06F 12/1441
See application file for complete search history.

(56) References Cited

U.S. PATENT DOCUMENTS 5,237,661 A * 8/1993 Kawamura .............. G06F 5/06
707/999.001
5,426,752 A * 6/1995 Takahasi ............. G06F 12/1009
711/209

(Continued)

OTHER PUBLICATIONS

Gosain, Yashu, and Prushothaman Palanichamy. "TrustZone Technology Support in Zynq-7000 All Programmable SoCs." Xilinx, Report (2014). (Year: 2014).*

(Continued)

*Primary Examiner* — Francisco A Grullon
(74) *Attorney, Agent, or Firm* — Harness, Dickey & Pierce, P.L.C.

(57) ABSTRACT

Provided are semiconductor devices. A semiconductor device includes processors performing an operation using data stored in a memory; and a memory protector dividing the memory into a first window area and a second window area. The first window area including a first fragment page, which is of a first size. The second window area including a second fragment page, which is of a second size, wherein the second size is smaller than the first size. The memory protector configured to protect the first fragment page and the second fragment page from being accessed by the processors.

17 Claims, 11 Drawing Sheets

(56) References Cited

U.S. PATENT DOCUMENTS

| | | | |
|---|---|---|---|
| 5,802,341 A * | 9/1998 | Kline | G06F 12/1009 |
| | | | 711/209 |
| 5,829,041 A * | 10/1998 | Okamoto | G06F 12/1072 |
| | | | 711/147 |
| 6,314,501 B1 * | 11/2001 | Gulick | G06F 9/54 |
| | | | 711/153 |
| 7,334,108 B1 * | 2/2008 | Case | G06F 12/1045 |
| | | | 711/209 |
| 7,412,579 B2 * | 8/2008 | O'Connor | G06F 12/1441 |
| | | | 710/107 |
| 7,444,523 B2 * | 10/2008 | Morais | G06F 21/78 |
| | | | 713/181 |
| 7,620,769 B2 * | 11/2009 | Lee | G06F 12/1416 |
| | | | 711/103 |
| 8,296,538 B2 | 10/2012 | Grisenthwaite | |
| 8,307,416 B2 | 11/2012 | Conti | |
| 8,347,012 B2 | 1/2013 | Goss et al. | |
| 8,375,221 B1 | 2/2013 | Thom et al. | |
| 8,738,860 B1 * | 5/2014 | Griffin | G06F 12/0831 |
| | | | 711/122 |
| 8,930,638 B2 | 1/2015 | Moll et al. | |
| 8,954,695 B1 * | 2/2015 | Thathapudi | G06F 12/145 |
| | | | 711/163 |
| 2003/0196065 A1 * | 10/2003 | Ronen | G06F 12/1009 |
| | | | 711/200 |
| 2004/0080512 A1 * | 4/2004 | McCormack | G06F 12/0215 |
| | | | 345/543 |
| 2006/0047920 A1 * | 3/2006 | Moore | G06F 3/0607 |
| | | | 711/154 |
| 2007/0226795 A1 | 9/2007 | Conti et al. | |
| 2008/0288742 A1 * | 11/2008 | Hepkin | G06F 12/1009 |
| | | | 711/201 |
| 2010/0306495 A1 * | 12/2010 | Kumano | G06F 3/061 |
| | | | 711/170 |
| 2012/0191933 A1 * | 7/2012 | Zbiciak | G06F 13/366 |
| | | | 711/163 |
| 2012/0198192 A1 * | 8/2012 | Balasubrannanian | H03K 19/0016 |
| | | | 711/163 |
| 2013/0013889 A1 | 1/2013 | Devaraj et al. | |
| 2013/0305342 A1 * | 11/2013 | Kottilingal | G06F 21/62 |
| | | | 726/11 |
| 2013/0305388 A1 * | 11/2013 | Kottilingal | G06F 21/6218 |
| | | | 726/28 |
| 2014/0122820 A1 * | 5/2014 | Park | G06F 21/74 |
| | | | 711/163 |
| 2014/0149687 A1 * | 5/2014 | Moll | G06F 12/0831 |
| | | | 711/146 |
| 2014/0201169 A1 * | 7/2014 | Liu | G06F 17/30 |
| | | | 707/692 |
| 2015/0012757 A1 | 1/2015 | Binder | |
| 2015/0052325 A1 | 2/2015 | Persson et al. | |

OTHER PUBLICATIONS

"AXI Reference guide." Xilinx Inc (2011). (Year: 2011).*
"LogiCORE IP Mailbox." Xilinx, Sep. 21, 2010. (Year: 2010).*
"ARM Security Technology Building a Secure System using TrustZone Technology." ARM Limited, (2009). (Year: 2009).*
"CoreLink™ TrustZone Address Space Controller TZC-380" ARM Technical Reference Manual 2010 (Year: 2010).*

* cited by examiner

| ADDR | W |
|---|---|
| 0×0100_0000 | 0 |
| ⋮ | ⋮ |
| 0×07FF_FFFF | 0 |
| ⋮ | ⋮ |
| 0×3000_0000 | 1 |
| ⋮ | ⋮ |
| 0×4FFF_FFFF | 1 |
| ⋮ | ⋮ |
| 0×5100_0000 | 0 |
| ⋮ | ⋮ |
| 0×57FF_FFFF | 0 |
| ⋮ | ⋮ |

| S_ADDR | E_ADDR | W |
|---|---|---|
| 0×0100_0000 | 0×07FF_FFFF | 0 |
| 0×3000_0000 | 0×4FFF_FFFF | 1 |
| 0×5100_0000 | 0×57FF_FFFF | 0 |
| ⋮ | ⋮ | ⋮ |

874

| S_ADDR | E_ADDR | W |
|--------|--------|-----|
| $A | $B | 001 |
| $C | $D | 010 |
| $E | $F | 011 |
| $G | $H | 100 |
| $I | $J | 101 |

1200

1300

1400

SEMICONDUCTOR DEVICE INCLUDING MEMORY PROTECTOR

This application claims priority under 35 U.S.C. § 119 to Korean Patent Application No. 10-2015-0092246 filed on Jun. 29, 2015 and Korean Patent Application No. 10-2015-0118708 filed on Aug. 24, 2015 in the Korean Intellectual Property Office, the disclosure of each of which is incorporated herein by reference in its entirety.

BACKGROUND

1. Field of Inventive Concepts

The present inventive concepts relate to a semiconductor device.

2. Description of the Related Art

In order to provide a secure execution environment for mobile applications, a mobile application may be configured such that one CPU (central processing unit) is provided with a secure area (or a secure world) and a normal area (or a normal world) without using an additional secure hardware chip. Here, a general application can be operated in a normal world, and an application requiring security can be safely operated in a secure world.

SUMMARY

At least some aspects of present inventive concepts provide a semiconductor device which can effectively obtain a secure buffer for security data.

However, aspects of present inventive concepts are not restricted to the one set forth herein. The above and other aspects of present inventive concepts will become more apparent to one of ordinary skill in the art to which present inventive concepts pertain by referencing the detailed description of present inventive concepts given below.

According to at least some example embodiments of present inventive concepts, there is provided a semiconductor device including a processor configured to perform an operation using data stored in a memory; and a memory protector configured to, divide the memory into a first window area and a second window area, the first window area including a first fragment page of a first size, the second window area including a second fragment page of a second size, the second size being smaller than the first size, and prevent the first fragment page and the second fragment page from being accessed by the processor if a request from the processor is not at least one of a security reading and a security writing.

The memory protector of example embodiments is configured to prevent the first fragment page and the second fragment page from being accessed by the processor based on a first page table, the first page table includes memory address information, the memory address information corresponds to at least one of the first window area and the second window area.

The processor of example embodiment is configured to, access the secure area by a secure address, and access the non-secure area by a non-secure address, and the semiconductor device further comprises: a content firewall controller configured to prevent the processor from (i) writing security content data in the non-secure area, or (ii) reading system data stored in the non-secure area. The content firewall controller is further configured to receive a physical address for accessing the memory from a memory management controller, the memory management controller is connected to the processor.

According to another example embodiment of present inventive concepts, there is provided a semiconductor device including a memory including a first window area, a second window area, and a secure buffer area, the memory configured to reserve the secure buffer area for security content data; a memory controller configured to, search a first fragment page of a first size in the first window area, allocate the first fragment page to the secure buffer area, and search a second fragment page of a second size in the second window area, the second size being smaller a the first size, and allocate the second fragment page to the secure buffer area; and a memory protector configured to, provide information about the first window area and the second window area to the memory controller, and protect the first fragment page and the second fragment page from being accessed if a request from the processor to access is not at least one of a security reading and security writing.

The memory protector according to an example embodiment is configured to provide information about the first window area and the second window area to the me controller based on a first page table, the first page table includes memory address information, the memory address information corresponds to at least one of the first window area and the second window area. The first page table further includes security attribute information about the memory address information, and window identification flag information corresponding to the memory address information.

According to another example embodiment of present inventive concepts, there is provided a semiconductor device including a first processor; a second processor, the first processor and the second processor configured to perform an operation based on data stored in a memory; a content firewall controller configured to determine whether a first physical address received from a memory management controller of the first processor is a secure address or a non-secure address; and a memory protector configured to receive a second physical address from at least one the content firewall controller and a memory management controller of the second processor to access the memory, divide the memory into a first window area and a second window area, the first window area including a first fragment page of a first size, the second window area including a second fragment page of a second size, the second size is smaller than the first size, and protect the first fragment page and the second fragment page from being accessed by the first processor and the second processor if a request, from the first and second processors, to access is not at least one of a security reading and a security writing.

According to an example embodiment the semiconductor further comprises a third processor, wherein the memory protector is configured to receive the second physical address from an external memory management controller connected to the third processor to access the memory. The memory protector is configured to divide the memory into a third window area, the third window area including a third fragment page of a third size; and protect the third fragment page from being accessed by the first and second processors if the request to access is not at least one of the security reading and the security writing.

According to an example embodiment, the memory controller of the semiconductor device comprises a memory protector and a memory controller. The memory protector is configured to divide the memory into a window area and generate information associated with the window area. The memory controller is configured to receive the generated information associated with the window area, and allocate a secure buffer area to the memory based on the information received from the memory protector about the window area. The memory controller is further configured to receive a command for accessing the memory from a processor, search the first fragment page, the first fragment page is in the first window area, allocate the first fragment page to the secure buffer area, search the second fragment, the second fragment is in the second window area, the second size is smaller than the first size, and allocate the second fragment page to the secure buffer.

BRIEF DESCRIPTION OF THE DRAWINGS

The above and other aspects and features of present inventive concepts will become more apparent by describing in detail non-limiting example embodiments thereof with reference to the attached drawings in which like reference characters refer to the like parts throughout the different views. The drawings are not necessarily to scale, emphasis instead being placed upon illustrating the principles of inventive concepts. In the drawings:

FIGS. 8 and 9A are schematic views illustrating a page table used by a memory protector according to an example embodiment of inventive concepts;

FIG. 9B is a schematic view illustrating another example embodiment of the page table illustrated in FIG. 9A.

DETAILED DESCRIPTION OF EXAMPLE EMBODIMENTS

Figure 1:
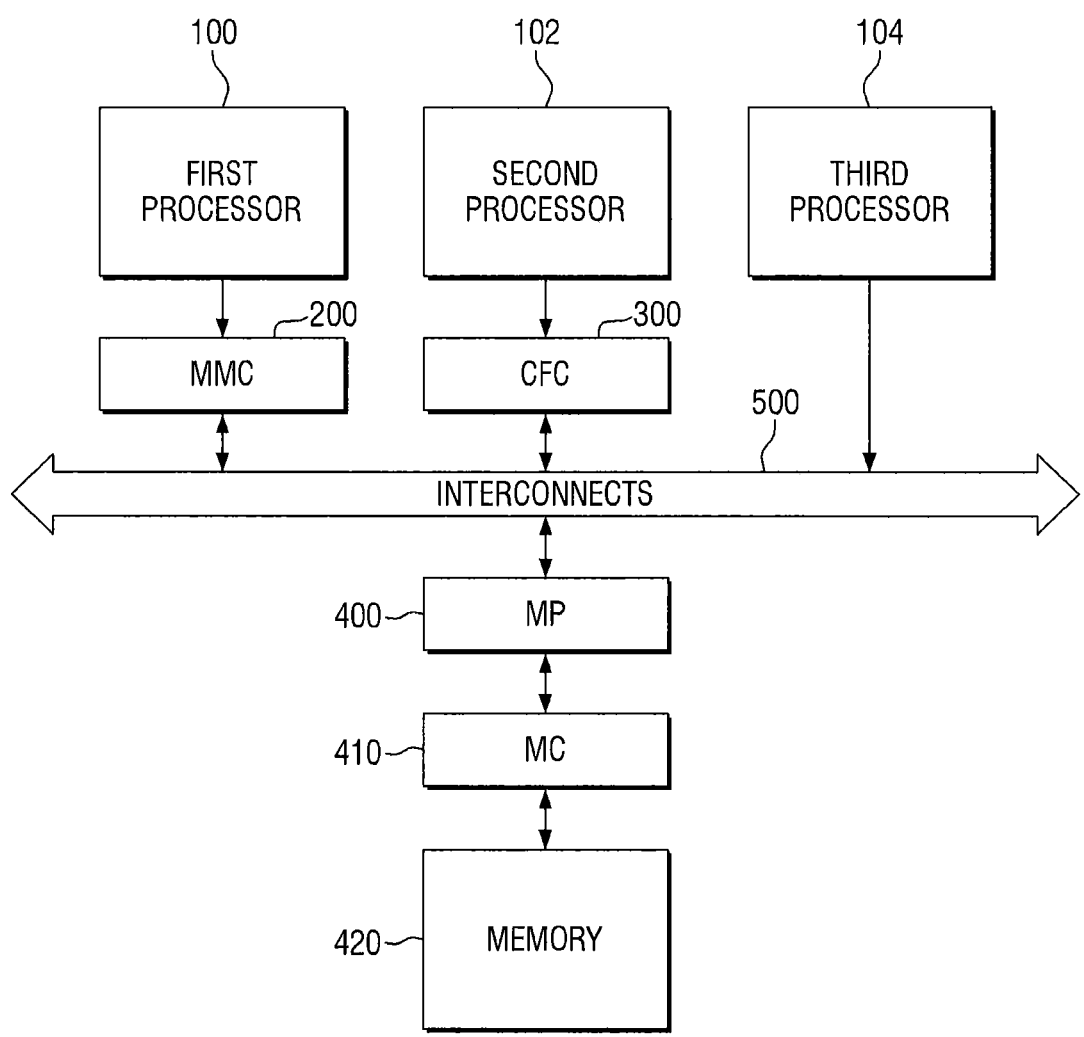
FIG. 1 is a schematic view illustrating a semiconductor device according to an example embodiment of inventive concepts.

Hereinafter, example embodiments will be described in detail with reference to the accompanying drawings. The inventive concepts, however, may be embodied in various different forms, and should not be construed as being limited only to the illustrated example embodiments, Rather, these example embodiments are provided as examples such that this disclosure will be thorough and complete, and will fully convey the concept of inventive concepts to those skilled in the art. Accordingly, known processes, elements, and techniques are not described with respect to some of example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

While inventive concepts are susceptible to various modifications and alternative forms, specific non-limiting example embodiments thereof are shown by way of example in the drawings and will herein be described in detail. It should be understood, however, that there is no intent to limit inventive concepts to the particular forms disclosed, but on the contrary, inventive concepts are to cover all modifications, equivalents, and alternatives falling within the spirit and scope of inventive concepts.

It will be understood that, although the terms "first", "second", "third", may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular example embodiments only and is not intended to be limiting to inventive concepts. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, hut do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent o" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Hereinafter, example embodiments of inventive concepts will be described with reference to the attached drawings.

FIG. 1 is a schematic view illustrating a semiconductor device according to an example embodiment of inventive concepts.

Referring to FIG. 1, the semiconductor device according to an example embodiment of inventive concepts may include first, second, and third processors 100, 102, and 104, a memory management controller 200, a content firewall controller 300, a memory protector 400, a memory controller 410, and a memory 420. These components can receive and transmit data through interconnects 500 (for example, bus). Here, the semiconductor device may be an application processor which may be used for mobile devices, but the scope of inventive concepts is not limited thereto.

The first processor 100, the second processor 102, the third processor 104, the memory management controller 200, the content firewall controller 300, the memory protector 400, and the memory controller 410 are either implemented using hardware components, a processor executing software components, or a combination thereof. Execution of one or more algorithms, described in example embodiments of inventive concepts, the aforementioned hardware components, or processor executing software components, result in a special purpose processor. Algorithms, as presented in example embodiments of inventive concepts, constitute sufficient structure, that may comprise of, including but not limited to, mathematical formulas, flow charts, computer codes, and/or steps, which upon execution result in a special purpose processor or computer.

The one or more aforementioned processors are computer processing devices configured to carry out the program code by performing arithmetical, logical, and input/output operations. Once a program code is loaded into one or more processors, the one or more processors may be programmed to perform the program code, thereby transforming the one or more processors into special purpose processor(s) or computer(s). Alternatively, or in addition to the processors discussed above, the hardware devices may include one or more Central Processing Units (CPUs), digital signal processors (DSPs), application-specific-integrated-circuits (ASICs), system on chips (SoCs), field programmable gate arrays (FPGAs), or the like. In at least some cases, the one or more CPUs, SoCs, digital signal processors (DSPs), application-specific integrated circuits (ASICs) and field-programmable gate arrays (FPGAs), may generally be referred to as processing circuits and/or microprocessors.

The first, second and third processors 100, 102, and 104 may perform an operation using the data stored in the memory 420. The first, second and third processors 100, 102, and 104 may provide a command for writing the data in the memory 420 and a command for reading the data stored in the memory 420 to the memory controller 410. Here, the data may be content data including multimedia data, but the scope of inventive concepts is not limited thereto. The data may be system data including operating system codes.

In some example embodiments of inventive concepts, the first, second and third processors 100, 102, and 104 may include a central processing unit (CPU), a graphic processing unit (GPU), a multimedia intellectual property (MIP), and the like, but the scope of inventive concepts is not limited thereto.

Meanwhile, the memory management controller 200 and the content firewall controller 300 will be described later with reference to FIGS. 2 and 3.

The memory protector 400 protects a part of memory from external non-secure accesses of the first, second and third processors 100, 102, and 104. Specifically, the memory protector 400 divides the area of the memory 420 into a plurality of window areas, and protects the plurality of window areas from the non-secure accesses of the first, second and third processors 100, 102, and 104.

It should be noted that one window area may include both a secure memory area storing security data and a non-secure memory area storing non-security data. Here, the secure memory area may be accessed by a secure address, and the non-secure memory area may be accessed by a non-secure address. Information about what address is a secure address or a non-secure address may be managed by memory protector 400 as a specific data structure, for example, a page table. The non-secure memory area included in one window region may be a candidate area for being allocated to a secure buffer to be described later.

The memory protector 400 provides the information about the plurality of window areas to the memory controller 410.

The memory controller 410 may process the requests of the processors 100, 102, and 104, for accessing the memory 420 and also may advocate a secure buffer area to the memory 420 on the basis of the information about the plurality of window area, e information having been provided from the memory protector 400.

The secure buffer area is referred to a secure memory area provided to store security data, for example, security content data, such as digital right management (DRM) data, That is, the security data protected by DRM must be stored in the memory area protected from the non-secure accesses of the first, second and third processors 100, 102, and 104.

For example, when the memory controller 410 receives write requests of security data of 1024 MB from the first, second and third processors 100, 102, and 104, the memory controller 410 must secure sufficient memory to successfully write the security data of 1024 MB. For the convenience of explanation, it is assumed that the security data requested by the first, second and third processors 100, 102, and 104 are DRM video data. In this case, when the secure memory area of 1024 MB is previously reserved in the memory 420 by anticipating the security data which is uncertain whether it is requested by the first, second and third processors 100, 102, and 104, this secure memory area cannot be used for any other purpose, thereby wasting memory resources.

Meanwhile, the amount of memory that should be reserved for the DRM video data requested by the first, second and third processors 100, 102, and 104 may be significant. However, even when available memory in the memory 420 has a sufficient size to store the DRM video data, particularly, if the available memory is divided into a very large number of small-size fragments (for example, less than 64 KB) and distributed as in mobile application execution environment, the collection of the sufficient amount memory for the DRM video data may be difficult.

The memory controller 410 overcomes such problems by allocating a secure buffer area to the memory 420 on the basis of the information about the plurality of window areas, the information having been provided from the memory protector 400, and detailed contents thereof will be described later.

The memory 420 may include the above-mentioned plurality of window areas, and may include the secure buffer area reserved to write security content data, in some example embodiments of inventive concepts, the memory 420 may include dynamic random-access memory (DRAM), but the kind of memory is not limited thereto.

Figure 2:
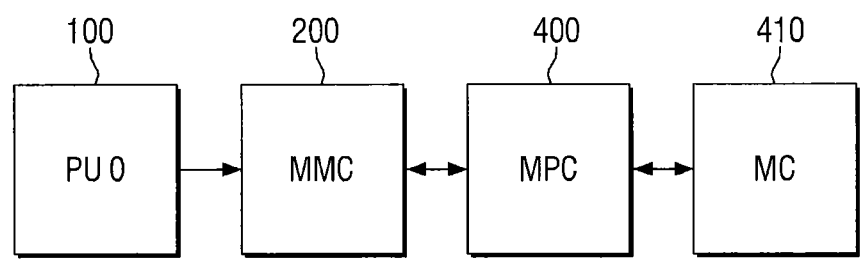
FIG. 2 is a schematic view illustrating an operation of the semiconductor device according to an example embodiment of inventive concepts.

FIG. 2 is a schematic view illustrating an operation of the semiconductor device according to an example embodiment of inventive concepts.

Referring to FIG. 2, the first processor 100 may be a multimedia IP. Examples of the multimedia IP may include, at least but not limited to, memory flow controller Scalers, and DeCON. The memory access request created from the first processor 100 is transmitted to the memory management controller 200.

The memory access request created from the first processor 100 uses a virtual address. The memory management controller 200 converts the virtual address included in the request into a physical address, and transmits the request including the physical address to the memory protector 400.

Together with this, the memory management controller 200 checks whether the memory accesses request created from the first processor 100 is a request for a secure address, and transmits the request to the memory protector 400 only when the request corresponds to one of security reading and security writing.

For example, when the request of the first processor 100 is a request for writing security content data in the non-secure memory area or a request for reading system data (for example, operating system codes) stored in the non-secure memory area, the memory management controller 200 may transmit an error message to the first processor 100 without processing such a request. In this way, the request from the first processor 100 that is not secure-aware may be processed through the memory management controller 200 that is secure-aware.

For this operation, the memory management controller 200 may manage and maintain a data structure, for example, a page table, which includes address information of the memory 420 and security attribute information about the address. In some example embodiments of inventive concepts, the security attribute information may include a secure reading flag, a secure writing flag, anon-secure reading flag, and a non-secure writing flag.

Thereafter, the memory controller 410 may process the request of the first processor 100, and also may allocate a secure buffer area to the memory 420 on the basis of the information about the plurality of window areas provided from the memory protector 400, as described later.

Figure 3:
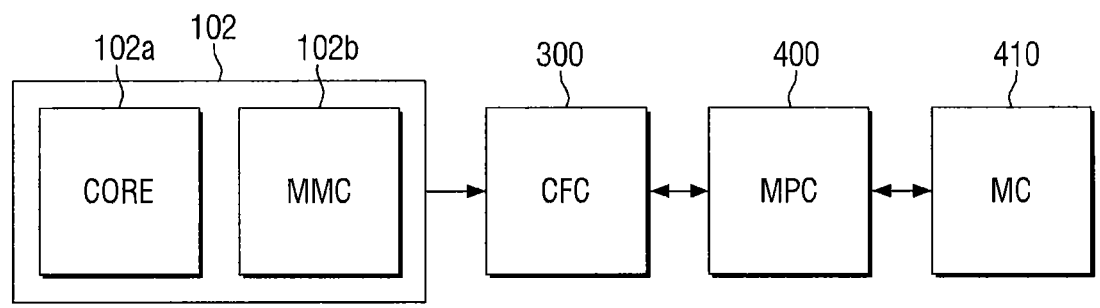
FIG. 3 is a schematic view illustrating another operation of the semiconductor device according to an example embodiment of inventive concepts.

FIG. 3 is a schematic view illustrating another operation of the semiconductor device according to an example embodiment of inventive concepts.

Referring to FIG. 3, the second processor 102 may be a graphics processing circuit (GPU). In this case, the second processor 102, that is, the GPU may include a GPU core 102a and a memory management controller 102b. Here, it is assumed that the memory management controller 102b included in the second processor 102 is not secure-aware.

The memory access request created from the GPU core 102a is transmitted to the memory management controller 102b, and the virtual address included in this request is converted into a physical address by memory management controller 102b. The memory management controller 102b may transmit the request including the physical address to the content firewall controller 300.

The content firewall controller 300 checks whether the memory accesses request created from the second processor 102 is a request for a secure address, and transmits the request to the memory protector 400 only when the request corresponds to one of security reading and security writing.

For example, when the request of the second processor 102 is a request for writing security content data in the non-secure memory area or a request for reading system data (for example, operating system codes) stoned in the non-secure memory area, the content firewall controller 300 may transmit an error message to the second processor 102 without processing such a request. In this way, the request from the second processor 102 that is not secure-aware may be processed through the content firewall controller 300 that is secure-aware.

For this operation, the content firewall controller 300 may manage and maintain a data structure, for example, a page table, which includes address information of the memory 420 and security attribute information about the address. In some example embodiments of inventive concepts, the security attribute information may include, at least, a secure reading a secure writing flag, a non-secure reading flag, and a non-secure writing flag.

Thereafter, the memory controller 410 may process the request of the second processor 102, and may also allocate a secure buffer area to the memory 420 on the basis of the information about the plurality of window areas provided from the memory protector 400, as described later.

Figure 4:
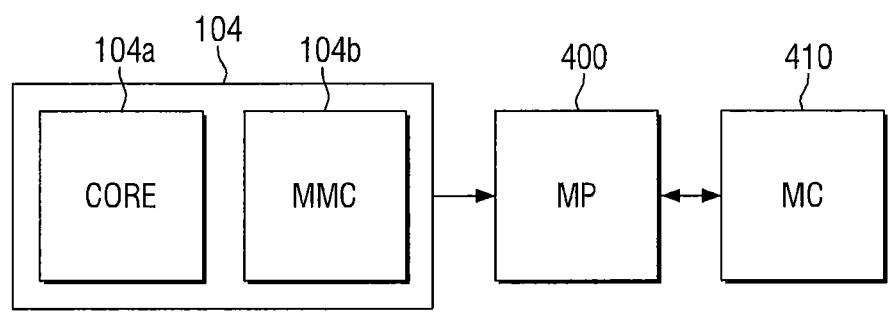
FIG. 4 is a schematic view illustrating still another operation of the semiconductor device according to an example embodiment of inventive concepts.

FIG. 4 is a schematic view illustrating still another operation of the semiconductor device according to an example embodiment of inventive concepts.

Referring to 4, the third processor 104 may be a CPU. In this case, the third processor 104, that is, the CPU may include a CPU core 104a and a memory management controller 104b. Here, it is assumed that the memory management controller 104b included in the third processor 104 is secure-aware.

The memory access request created from the CPU core 104a is transmitted to the memory management controller 104b, and the virtual address included in this request is converted into a physical address by the memory management controller 104b. The memory management controller 104b may transmit the request including the physical address to the memory protector 400.

In an example embodiment, since the memory management controller 104b included in the third processor 104 checks whether the memory accesses request previously created from the CPU core 104a is a request for a secure address, additional components are not required.

Thereafter, the memory controller 410 may process the request of the second processor 102, and may also allocate a secure buffer area to the memory 420 on the basis of the information about the plurality of window areas provided from the memory protector 400, as described later.

Figure 5:
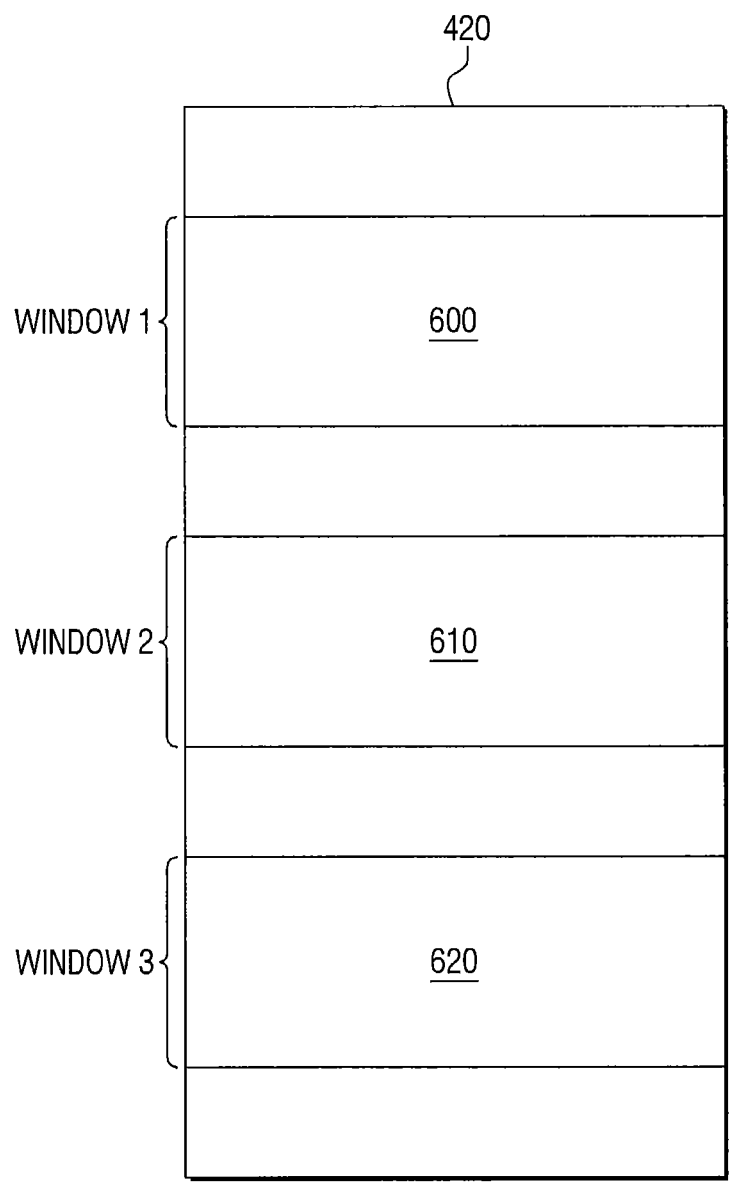
FIG. 5 is a schematic view illustrating a memory structure of the semiconductor device according to an example embodiment of inventive concepts.

FIG. 5 is a schematic view illustrating a memory structure of the semiconductor device according to an example embodiment of inventive concepts.

Referring to FIG. 5, the memory 420 may include a plurality of window areas 600, 610, and 620.

As described above, each of the window areas 600, 610, and 620 may include both a secure memory area and non-secure memory area, which respectively accessed by a secure address and a non-secure address. Further, each of the window areas 600, 610, and 620 may include an unavailable memory area which is allocated to a specific processor and is already in use, and an available memory area which can be used as needed. Particularly, in some example embodiments of inventive concepts, the available memory area may include a fragment page remaining between the unavailable memory areas.

For example, each of the window areas 600 and 620 may include a memory area in which memory allocation and de-allocation on for comparative small-size data frequently occur. When memory allocation and de-allocation for comparative small-size data frequently occur in the memory area, the fragmentation rate of the corresponding memory area may increase. Therefore, the available memory area existing in each of the window areas 600 and 620 may exist as a large number of small-size fragment pages. For example, the available memory area existing in each of the window areas 600 and 620 may include a large number of fragment pages having a size of less than 64 KB.

On the other hand, the window area 610 may include a memory area in which memory allocation and de-allocation for comparative large-size data (for example, multimedia data) do not frequently occur. When memory allocation and dc-allocation for a comparative large-size data do not frequently occur in the memory area, the fragmentation rate of the corresponding memory area may decrease. Therefore, the available memory area existing in the window area 610 may exist as a small number of large-size fragment pages. For example, the available memory area existing in the window area 610 may include a small number of fragment pages having a size of more than 64 KB.

Figure 6:
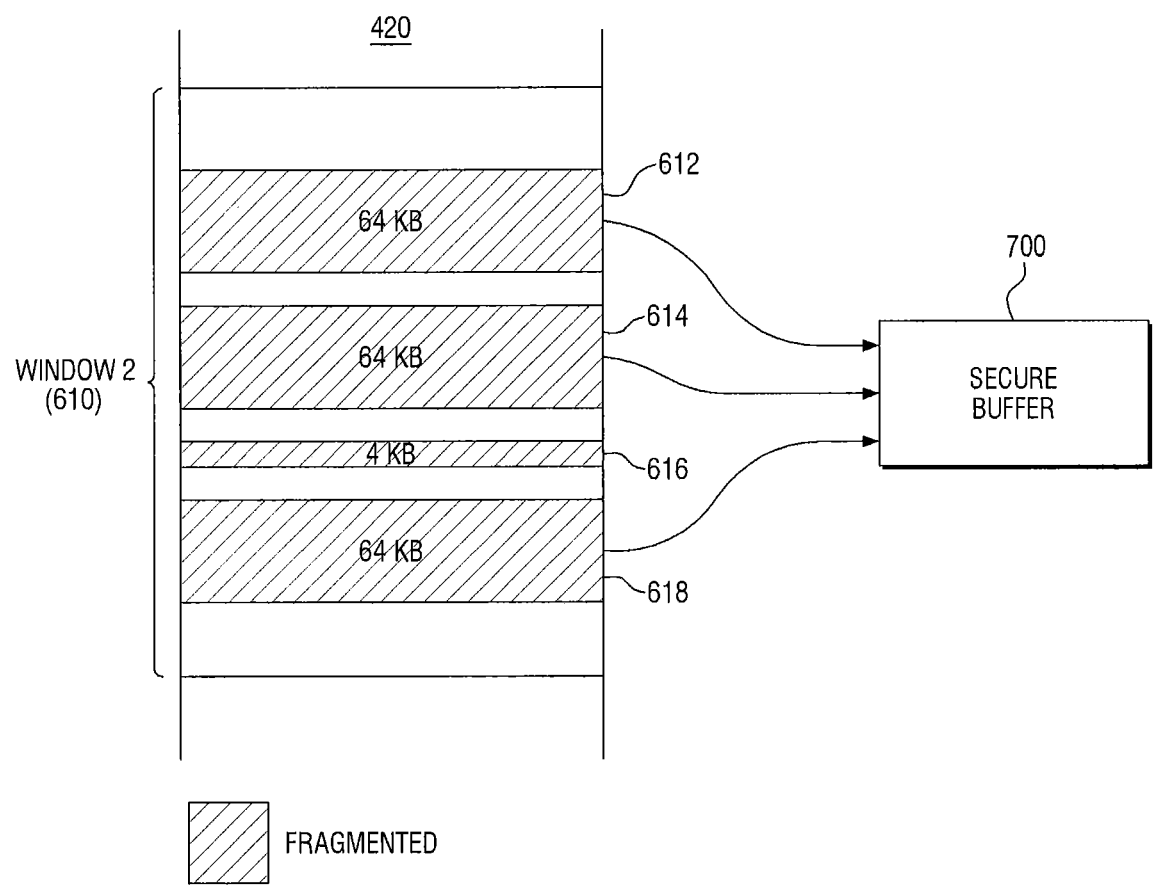
FIGS. 6 and 7 are schematic views each illustrating a memory allocation process of the semiconductor device according to an example embodiment of inventive concepts.
Figure 7:
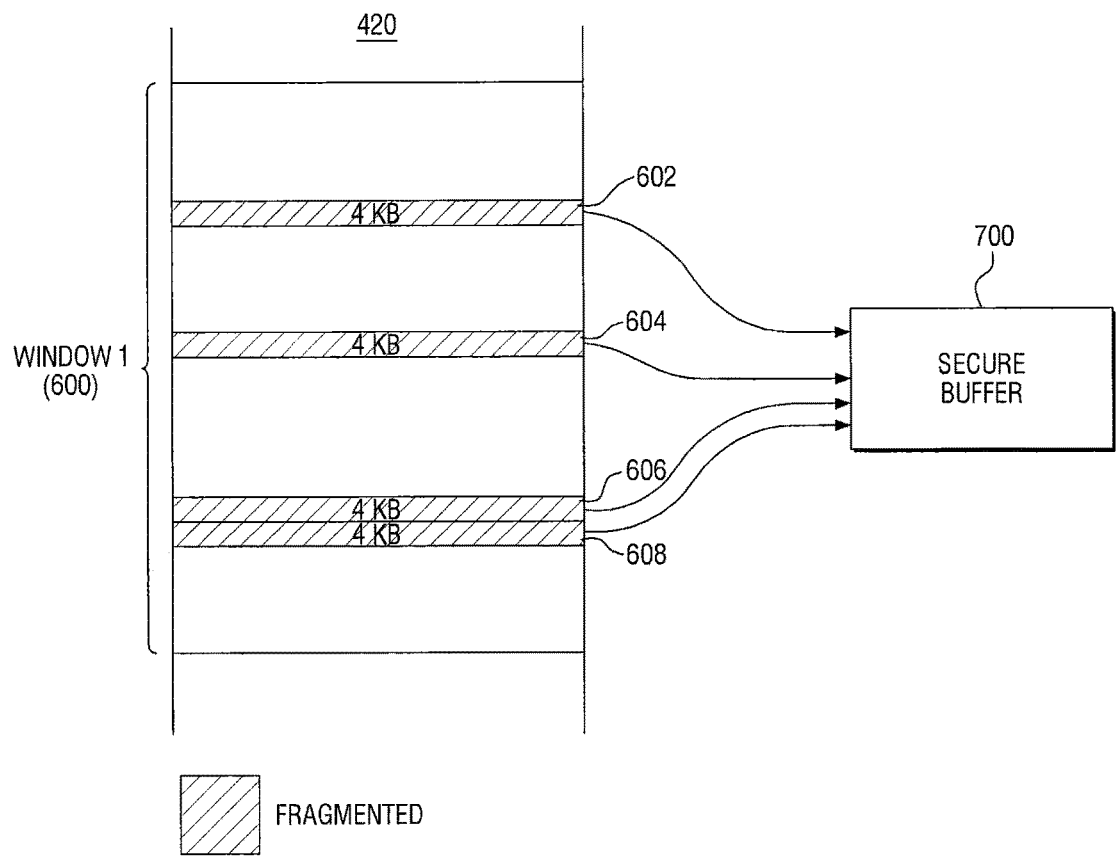

FIGS. 6 and 7 are schematic views each illustrating a memory allocation process of the semiconductor device according to an example embodiment of inventive concepts.

Referring to FIG. 6, available memory areas having a size of more than 64 KB mostly exist in the window area 610 described above with reference to FIG. 5. In this case, the memory protector 400 may protect fragment pages 612, 614, and 618 having a size of 64 KB from the non-secure accesses of the first, second and third processors 100, 102, and 104.

For example, the memory protector 400 may allocate the fragment pages 612, 614, and 618 having a size of 64 KB as a secure buffer 700 for storing security content data. In this case, comparatively large-size available memory areas are allocated to the secure buffer 700, thereby obtaining the capacity necessary for the secure buffer 700 in a comparatively small operating overhead.

However, since the memory protector 400 searches a fragment page, which is an available memory area in the window area 610, only in a size of 64 KB, only the fragment pages 612, 614, and 618 having a size of 64 KB are allocated to the secure buffer 700 even when the window area 610 includes a large number of fragment pages 616 having a size of 4 KB, If the fragment pages having a size of 64 KB are insufficient, delay or failure may occur in order to obtain the secure buffer 700.

Referring to FIG. 7, available memory areas having a size of less than 4 KB mostly exist in the window area 600 described above with reference to FIG. 5. In this case, the memory protector 400 may protect fragment pages 602, 604, 606, and 608 having a size of 4 KB from the non-secure accesses of the first, second and third processors 100, 102, and 104.

For example, the memory protector 400 may allocate the fragment pages 602, 604, 606, and 608 having a size of 4 KB as a secure buffer 700 for storing security content data. Therefore, the capacity necessary for the secure buffer 700 can be obtained even from the memory area having a high fragmentation rate.

As illustrated in FIGS. 6 and 7, the collection of comparatively large-size fragment pages and the collection of comparatively small-size fragment pages respectively have both advantages and disadvantages. That is, the collection of comparatively large-size fragment pages is advantageous in that high capacity can be rapidly obtained in a comparative small overhead, but is disadvantageous in that comparatively small-size fragment pages cannot be utilized. Meanwhile, the collection of comparatively small-size fragment pages is advantageous in that memory resources can be sufficiently utilized, but is disadvantageous in that overhead frequently occurs.

Therefore, in various example embodiments of inventive concepts, the memory 420 includes the plurality of window areas 600, 610, and 620, The memory areas corresponding to the window areas 600 and 620 in the plurality of window areas 600, 610, and 620 provide fragment pages in a comparatively small size, and the memory areas corresponding to the window area 610 in the plurality of window areas 600, 610, and 620 provide fragment pages in a comparatively large size, thereby effectively obtaining the secure buffer 700 for security content data.

Figure 8:
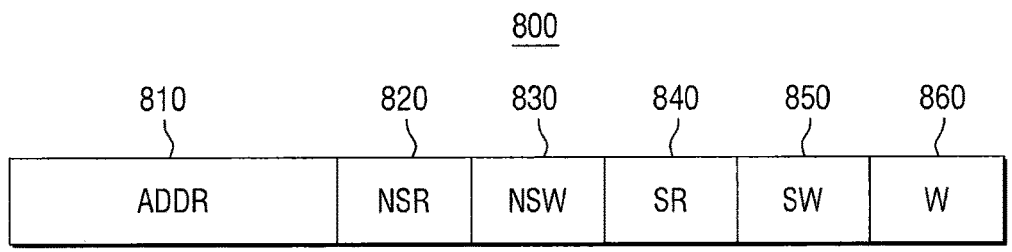

FIGS. 8 and 9A are schematic views illustrating a page table used by a memory protector 400 according to an example embodiment of inventive concepts.

Referring to FIG. 8, the memory protector 400 can use page table 800 including memory address information corresponding to the plurality of window areas 600, 610, and 620.

The page table 800 may include memory address 810 of the memory 420, security attribute information 820, 830, 840, and 850 about the address, and window identification flag information 860 corresponding to the address.

In some example embodiments of inventive concepts, the security attribute information 820, 830, 840, and 850 may include a non-secure reading (NSR) flag 820, a non-secure writing (NSW) 830, a secure reading (SR) and a secure writing (SW) flag (850), For example, it means that non-secure access is possible in the memory address in which the non-secure reading flag 820 and the non-secure writing flag 830 are set, and it means that only secure access is possible in the memory address in which the secure reading flag 840 and the secure writing flag 850 are set.

Meanwhile, referring to FIG. 9A, in the page table 870, the window areas 600, 610, and 620 are divided using the window identification flag information 860.

For example, when the value of the window identification flag information 860 is '0', the memory area corresponding to the memory address 810 may be searched as a fragment page of a first size (for example, 4 KB). Unlike this, when the value of the window identification flag information 860 is '1', the memory area corresponding to the memory address 810 may be searched as a fragment page of a second size (for example, 64 KB).

For example, since the value of the window identification flag information 860 in the memory area corresponding to the memory addresses 810 of "0x0100_0000" to "0x07FF_FFFF" is '0', this memory area may mean the window area 600 that can provide fragment pages of a first size example, 4 KB). Further, since the value of the window identification flag information 860 in the memory area corresponding to the memory addresses 810 of "0x3000_0000" to "0x4FFF_FFFF" is '1', this memory area may mean the window area 610 that can provide fragment pages of a second size (for example, 64 KB). Moreover, since the value of the window identification flag information 860 in the memory area corresponding to the memory addresses 810 of "0x5100_0000" to "0x57FF_FFFF" is '0', this memory area may mean the window area 620 that can provide fragment pages of a first size (for example, 4 KB).

As described above, the memory 420 includes the plurality of window areas 600, 610, and 620. In the plurality of window areas 600, 610, and 620, the memory areas corresponding to the window areas 600 and 620 provide fragment pages in a comparatively small size, and the memory areas corresponding to the window area 610 provide fragment pages in a comparatively large size, thereby effectively obtaining the secure buffer 700 for security content data.

FIG. 9B is a schematic view illustrating another example embodiment of the page table illustrated in FIG. 9A.

Referring to FIG. 9B, a page table 872, in which the window areas 600, 610, and 620 are divided using the window identification flag information 860, may be different from the page table 870 described with reference to FIG. 9A.

In the case of the page table 870 of FIG. 9A, the window identification flag 860 is stored with respect to each memory address 810. For example, memory addresses 810 of "0x0100_0000" to "0x07FF_FFFF" have window identification flags 860 each having a value of '0', and memory addresses 810 of "0x3000_0000" to "0x4FFF_FFFF" have window identification flag 860 each having a value of '1'. When the page table 870 is configured in this way, the size of the page table 870 becomes very large because each of n memory addresses 810 (here, n is an integer of 1 or more) includes n window identification flags 860.

Unlike this, in the page table 872 of an example embodiment, the window identification flag 860 is not stored with respect to each memory address 810, and only one window identification flag 860 is allocated to each window area. Specifically, the page table 872 may include a start address (S_ADDR), an end address (E_ADDR), and a window identification flag (W) column.

For example, the window area 600, in which the start address is "0x0100_0000" and the end address is "0x07FF_FFFF", stores a window identification flag having a value of '0' to allow a window corresponding to the address range to provide a fragment page of a first size (for example, 4 KB). Further, the window area 620, in which the start address is "0x3000_0000" and the end address is "0x4FFF_FFFF", stores a window identification flag having a value of '1' to allow a window corresponding to the address range to provide a fragment page of a second size (for example, 64 KB).

Since the page table 872 configured in this way includes only a single window identification flag 860 with respect to each area specified by the window areas 600, 610, and 620, the size thereof may become very small.

Figure 9C:
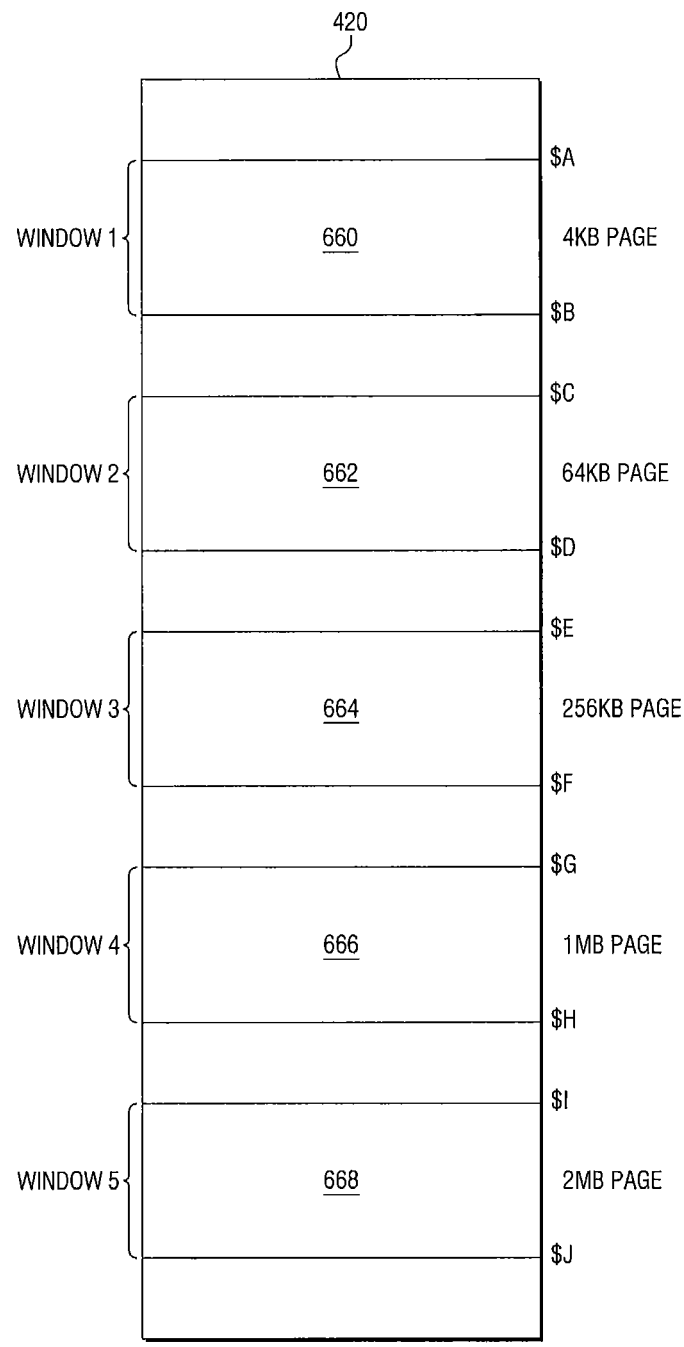
FIG. 9C is a schematic view illustrating still another operation of the semiconductor device according to an example embodiment of inventive concepts.
Figures 9D, 10:
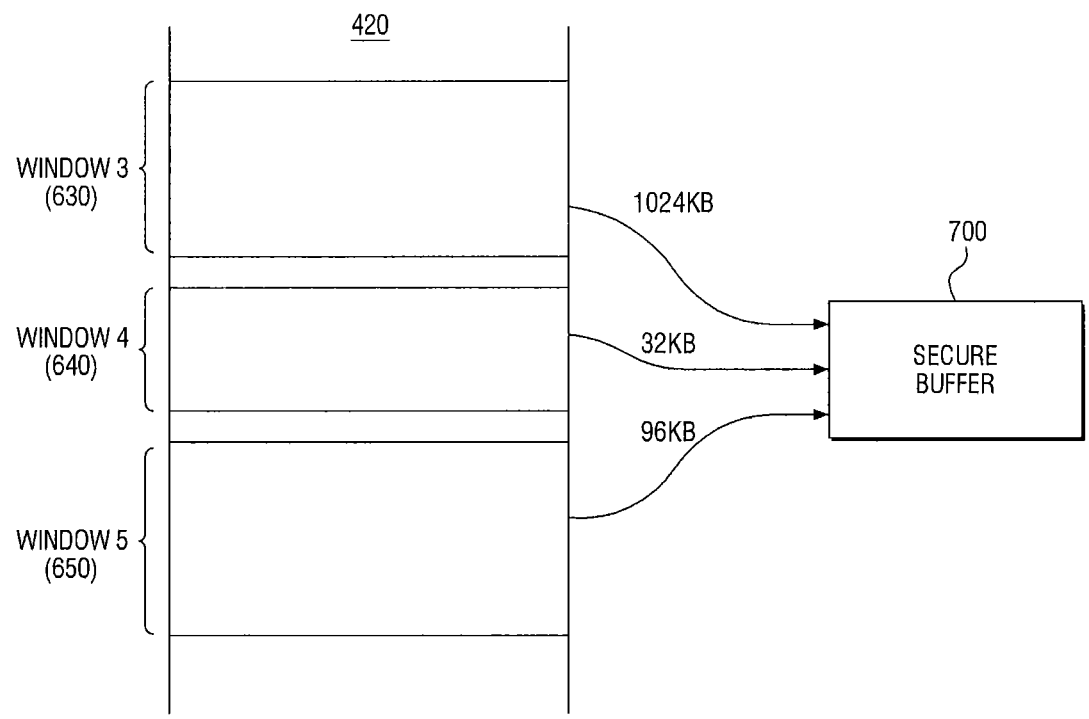
FIG. 9D is a schematic view illustrating a page table used in the operation illustrated in FIG. 9C.
FIG. 10 is a schematic view illustrating a memory allocation process of the semiconductor device according to another example embodiment of inventive concepts.

FIG. 9C is a schematic view illustrating still another operation of the semiconductor device according to an example embodiment of inventive concepts, and FIG. 9D is a schematic view illustrating a page table used in the operation illustrated in FIG. 9C.

Referring to FIG. 9C, the memory 420 may include a plurality of window areas 660, 662, 664, 666, and 668.

For example, each of the window areas 660 and 662 may include a memory area in which memory allocation and de-allocation for a comparative small-size data frequently occur. When memory allocation and de-allocation for a comparative small-size data frequently occur in the memory area, the fragmentation rate of the corresponding memory area may increase. Therefore, the available memory area existing in each of the window areas 660 and 662 may exist as a large number of small-size fragment pages. For example, the available memory area existing in each of the window areas 660 and 662 may include a large number of fragment pages having a size of less than 64 KB.

On the other hand, each of the window areas 666 and 668 may include a memory area in which memory allocation and de-allocation for comparative large-size data (for example, multimedia data) do not frequently occur. When memory allocation and de-allocation for comparative large-size data do not frequently occur in the memory area, the fragmentation rate of the corresponding memory area may decrease. Therefore, the available memory area existing in each of the window areas 666 and 668 may exist as a small number of large-size fragment pages. For example, the available memory area existing in each of the window areas 666 and 668 may include a small number of fragment pages having a size of more than 64 KB.

In consideration of such characteristics of the memory 420, the memory area corresponding to the window area 660 may be researched in a fragment page unit of a first size (for example, 4 KB), the memory area corresponding to the window area 662 may be researched in a fragment page of a second size example, 16 KB), the memory area corresponding to the window area 664 may be researched in a fragment page unit of a third size (for example, 256 KB), the memory area corresponding to the window area 666 may be researched in a fragment page unit of a fourth size (for example, 1 MB), and the memory area corresponding to the window area 668 may be researched in a fragment page unit of a fifth size (for example, 2 MB).

Meanwhile, in order to divide the plurality of window areas providing fragment pages of several sizes, the window identification flag 860 may be expressed by multi-bits. For example, in an example embodiment, since total five window areas must be divided, the window identification flag 860 may be expressed by three bits such that at least six values can be divided. For example, the window identification flags 860 corresponding to the window areas 660, 662, 664, 666, and 668 may be specified by "001", "010", "011", "100", and "101", respectively.

Referring to FIG. 9D, the page table 872, in which the window areas 660, 662, 664, 666, and 668 are divided using the window identification flag information on the basis of the above-mentioned contents, may include a start address (S_ADDR), an end address (E_ADDR), and a window identification flag (W) column.

For example, the window area 662, in which the start address is "$C" and the end address is "$D", stores a window identification flag having a value of '010' to allow a window corresponding to the address range to provide a fragment page of a second size (for example, 64 KB), Further, the window area 668, in which the start address is "$I" and the end address is "$J", stores a window identification flag having a value of '101' to allow a window corresponding to the address range to provide a fragment page of a fifth size (for example, 2 MB).

Since the page table 874 configured in this way includes only a single window identification flag 860 with respect to each area specified by the window areas 660, 662, 664, 666, and 668, the size thereof may become very small.

FIG. 10 is a schematic view illustrating a memory allocation process of the semiconductor device according to another example embodiment of inventive concepts.

Referring to FIG. 10, the memory 420 may include windows areas 630, 640, and 650.

This example embodiment is different from the foregoing example embodiments in that fragment pages can be dynamically allocated to the secure buffer 700. As described above, when a secure memory area is previously reserved in the memory 420 by anticipating the security data which is uncertain whether it is requested by the first, second and third processors 100, 102, and 104, this secure memory area cannot be used for any other purpose until the requests of the first, second and third processors 100, 102, and 104 really exist, thereby wasting memory resources.

Therefore, in an example embodiment, the memory protector 400 may divide the window areas 630, 640, and 650 in the memory 420, but may dynamically allocate page fragments in consideration of memory capacity necessary for the secure buffer 700.

For example, when memory capacity of 1024 KB is required at the first time in order to obtain the secure buffer 700, the memory protector 400 may collect available memory from only the window area 630 in the memory 420, and allocate the collected available memory to the secure buffer 700. Thereafter, when additional memory capacity of 128 KB is required at the second time, the memory protector 400 may collect available memory from the window areas 640 and 650 in the memory 420, and additionally allocate the collected available memory to e secure buffer 700.

Of course, even in an example embodiment, as the foregoing example embodiments, the window areas 630, 640, and 650 may be set such that fragment pages can be provided in different sizes from each other. For example, the window area 630 may be searched in a fragment page unit of a second size (for example, 64 KB), and each of the window areas 640 and 650 may be searched in a fragment page unit of a first size (for example, 4 KB).

As described above, the memory 420 includes the plurality of window areas 630, 640, and 650. The memory areas corresponding to the window areas 640 and 650 in the plurality of window areas 630, 640, and 650 provide fragment pages in a comparatively small size, the memory areas corresponding to the window area 630 in the plurality of window areas 630, 640, and 650 provide fragment pages in a comparatively large size, and, if necessary, available memory is dynamically provided to the secure buffer 700, thereby effectively obtaining the secure buffer 700 for security content data.

Figure 11:
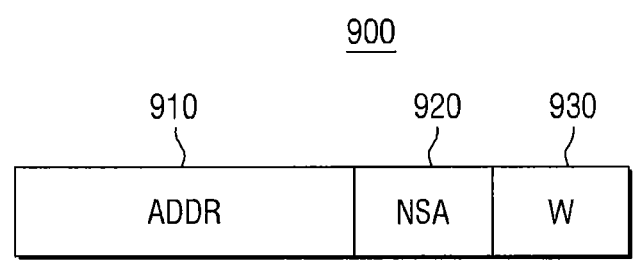
FIG. 11 is a schematic view illustrating a page table used by a memory protector according to another example embodiment of inventive concepts.

FIG. 11 is a schematic view illustrating a page table used by a memory protector according to another example embodiment of inventive concepts.

Referring to FIG. 11, unlike example embodiment of FIG. 8, the page table 900 of the memory protector 400 according to another example embodiment of inventive concepts may include address information 910 of the memory 420, security attribute information 920 about the address, and window identification flag information 930 corresponding to the address.

The page table 900 includes only a non-secure access (NSA) flag as the security attribute information 920 instead of a non-secure reading (NSR) flag, a non-secure writing (NSW) flag, a secure reading (SR) flag, and a secure writing (SW) flag, thereby reducing the size of the page table 900 while allowing the access between the non-secure memory area and the secure memory area.

Figure 12:
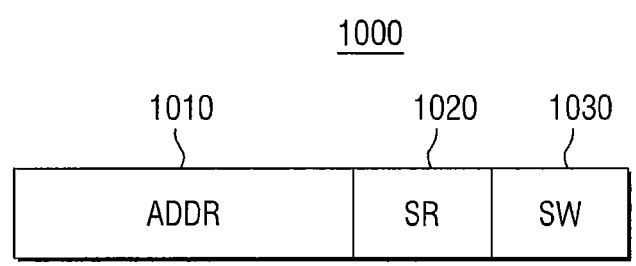
FIG. 12 is a schematic view illustrating a page table used by a content firewall controller and a memory management controller according to an example embodiment of inventive concepts.

FIG. 12 is a schematic view illustrating a page table used by a content firewall controller and a memory management controller according to an example embodiment of inventive concepts.

Referring to FIG. 12, unlike example embodiments of FIGS. 2 and 3, the security attribute information included in the page table 1000 of the content firewall controller 300 and the memory management controller 200 according to another example embodiment of inventive concepts include only a secure reading flag and a secure writing flag.

The page table 1000 includes only the secure reading flag and the secure writing flag as the security attribute information instead of a non-secure reading (NSR) flag, a non-secure writing (NSW) flag, a secure reading (SR) flag, and a secure writing (SW) flag. In this case, non-secure-aware requests from the first processor 100 can be managed even by only the secure reading flag and the secure writing flag such that these requests become secure-aware. As such, only the secure reading flag and the secure writing flag are maintained in the page table 1000, thereby reducing the size of the table page 1000.

Figure 13:
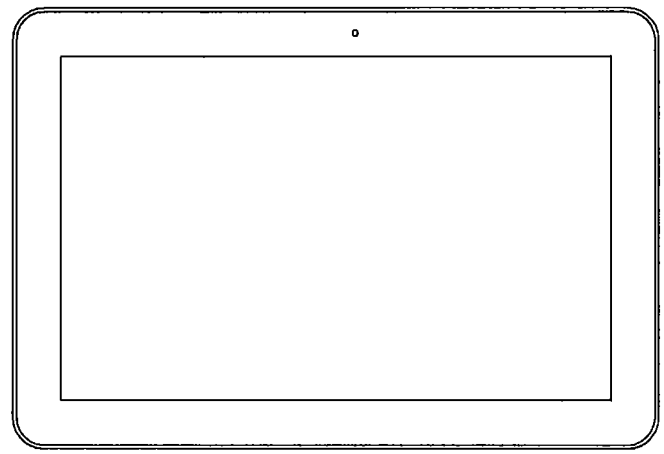
FIGS. 13 to 15 show example embodiments of semiconductor systems, which can apply the semiconductor devices according to some example embodiments of inventive concepts.
Figure 14:
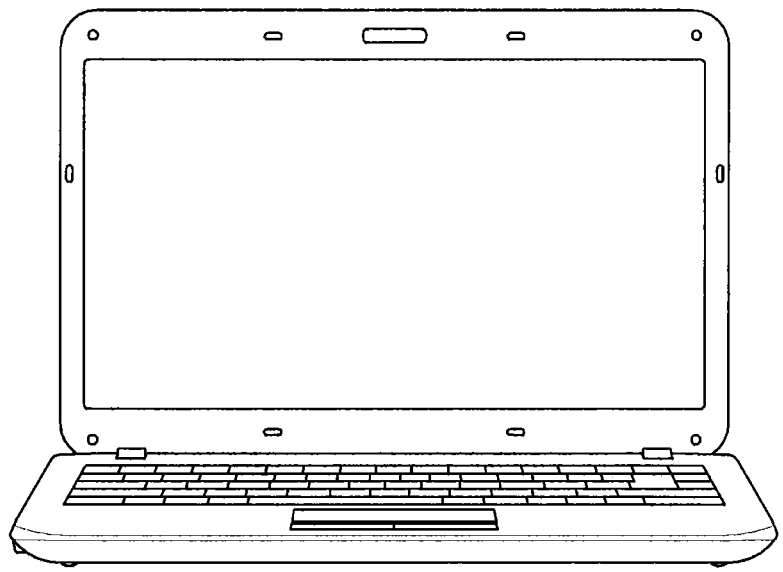
Figure 15:
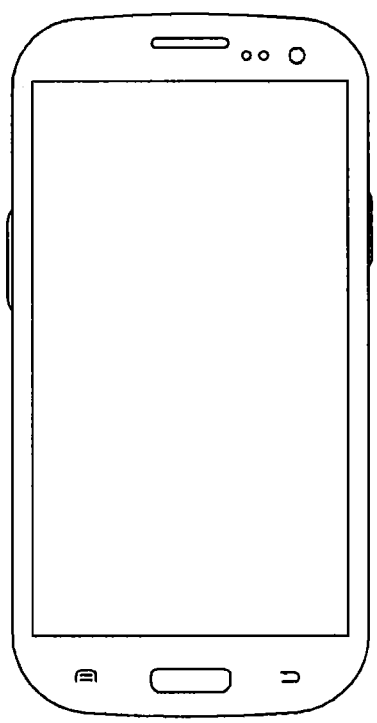

FIGS. 13 to 15 show non-limiting example embodiments of semiconductor systems, which can apply the semiconductor devices according to some example embodiments of inventive concepts.

FIG. 13 shows a tablet PC 1200, FIG. 14 shows a notebook computer 1300, and FIG. 15 shows a smart phone 1400, The semiconductor devices, as discussed above, according to some example embodiments of inventive concepts, can be used for, including but not limited to, the tablet PC 1200, the notebook computer 1300, and/or the smart phone 1400. Further, it is obvious to those skilled in the art that the semiconductor devices, as discussed above, according to some example embodiments of inventive concepts can also be applied to other integrated circuit devices that are not illustrated herein. That is, it has been described heretofore that examples of the semiconductor system according to the present non-limiting example embodiments include the tablet PC 1200, the notebook computer 1300, and the smart phone 1400. However, examples thereof are not limited thereto. In some example embodiments of inventive concepts, the semiconductor system can be realized as, including but not limited to, a computer, an ultra-mobile PC, a workstation, a net-hook, a personal digital assistant (PDA), a portable computer, a wireless phone, a mobile phone, an c-book, a portable multimedia player (PMP), a portable game machine, a navigation apparatus, a black box, a digital camera, a 3-dimensional television, a digital audio recorder, a digital picture recorder, a digital picture player, a digital video recorder, or a digital video player.

It is to be understood that although the example embodiments of inventive concepts have been disclosed for illustrative purposes, those skilled in the art will appreciate that various modifications, additions and substitutions are possible, without departing from the scope and spirit of inventive concepts as disclosed in the accompanying claims.

What is claimed is:

1. A semiconductor device, comprising:
   a processor configured to perform an operation based on data stored in a memory; and a memory protector configured to,
divide the memory into a contiguous first window area and a contiguous second window area, the first window area including a first memory area for memory allocation and de-allocation for a first data, the first memory area divided into a first fragment page of a first size, the second window area including a second memory area for memory allocation and de-allocation for a second data, the second memory area divided into a second fragment page of a second size, the second size being smaller than the first size, and
prevent the first fragment page and the second fragment page from being accessed by the processor if a request from the processor is not at least one of a security reading and a security writing,
wherein a size of the second data is smaller than a size of the first data.

2. The semiconductor device of claim 1, wherein the memory protector is configured to prevent the first fragment page and the second fragment page from being accessed by the processor based on a first page table, the first page table includes memory address information, the memory address information corresponds to at least one of the first window area and the second window area.

3. The semiconductor device of claim 2, wherein the first page table further includes,
security attribute information about the memory address information, and
window identification flag information corresponding to the memory address information.

4. The semiconductor device of claim 3, wherein the security attribute information includes a secure reading flag, a secure writing flag, a non-secure reading flag, and a non-secure writing flag.

5. The semiconductor device of claim 3, wherein the security attribute information only includes a non-secure access flag.

6. The semiconductor device of claim 1, wherein the memory protector is further configured to,
divide the memory into a third window area, the third window area includes a third fragment page of a third size, and
prevent the third fragment page from being accessed by the processor if the request is not at least one of the security reading and the security writing.

7. The semiconductor device of claim 1, wherein the first size is 64 KB and the second size is 4 KB.

8. The semiconductor device of claim 1, wherein the memory includes dynamic random access memory (DRAM).

9. The semiconductor device of claim 1, wherein, the memory includes a secure area and a non-secure area, the processor is configured to,
access the secure area by a secure address, and
access the non-secure area by a non-secure address, and
the semiconductor device further comprises:
a content firewall controller configured to prevent the processor from (i) writing security content data in the non-secure area, or (ii) reading system data stored in the non-secure area.

10. The semiconductor device of claim 9, wherein the content firewall controller is configured to use a second page table, the second page table includes memory address information and security attribute information about the memory address information.

11. The semiconductor device of claim 10, wherein the security attribute information includes a secure reading flag, a secure writing flag, a non-secure reading flag, and a non-secure writing flag.

12. The semiconductor device of claim 10, wherein the security attribute information includes only a secure reading flag and a secure writing flag.

13. The semiconductor device of claim 9, wherein the content firewall controller is further configured to receive a physical address for accessing the memory from a memory management controller, the memory management controller is connected to the processor.

14. The semiconductor device of claim 1, wherein,
the memory protector is configured to prevent the first fragment page from being accessed if a window identification flag information corresponding to memory address information is a first security attribute, and
the memory protector is configured to prevent the second fragment page from being accessed if the window identification flag information is a second security attribute.

15. A semiconductor device, comprising:
a processor configured to perform an operation based on data stored in a memory; and
a memory protector configured to,
divide the memory into a first window area and a second window area, the first window area including a first memory area for memory allocation and de-allocation for a first data, the first memory area including a first fragment page of a first size, the second window area including a second memory area for memory allocation and de-allocation for a second data, the second memory area including a second fragment page of a second size, the second size being smaller than the first size,
allocate the first fragment page and the second fragment page to a secure buffer based on information about the first window area and the second window area, and
prevent the first fragment page and the second fragment page allocated to the secure buffer from being accessed by the processor if a request from the processor is not at least one of a security reading and a security writing,
wherein a size of the second data is smaller than a size of the first data
wherein the first fragment page and the second fragment page total a size sufficient to secure the buffer.

16. The semiconductor device of claim 15, wherein the memory protector is further configured to,
divide the memory into a third window area, the third window area includes a third fragment page of a third size, and
prevent the third fragment page from being accessed by the processor if the request is not at least one of the security reading and the security writing.

17. The semiconductor device of claim 16, wherein the memory protector is further configured to allocate the third fragment page to the secure buffer.

* * * * *